US012416756B2

(12) United States Patent
Agemizu et al.

(10) Patent No.: US 12,416,756 B2
(45) Date of Patent: Sep. 16, 2025

(54) SURFACE LIGHT-EMITTING DEVICE, DISPLAY DEVICE, AND ILLUMINATION DEVICE

(71) Applicant: Panasonic Intellectual Property Management Co., Ltd., Osaka (JP)

(72) Inventors: Wahei Agemizu, Osaka (JP); Kazumasa Takata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/905,145

(22) Filed: Oct. 3, 2024

(65) Prior Publication Data

US 2025/0028108 A1 Jan. 23, 2025

Related U.S. Application Data

(63) Continuation of application No. PCT/JP2023/005267, filed on Feb. 15, 2023.

(30) Foreign Application Priority Data

Apr. 13, 2022 (JP) .................................. 2022-066127

(51) Int. Cl.
 *F21V 8/00* (2006.01)
(52) U.S. Cl.
 CPC ............ *G02B 6/0045* (2013.01); *G02B 6/002* (2013.01); *G02B 6/0068* (2013.01)
(58) Field of Classification Search
 CPC ..... G02B 6/0045; G02B 6/002; G02B 6/0068
 See application file for complete search history.

(56) References Cited

U.S. PATENT DOCUMENTS

2007/0058108 A1 3/2007 Uehara et al.
2012/0155109 A1* 6/2012 Hayashi ............... G02B 6/0068
                                                    362/613

(Continued)

FOREIGN PATENT DOCUMENTS

JP     2007-079093     3/2007
JP     2016-027546     2/2016

(Continued)

OTHER PUBLICATIONS

International Search Report of PCT application No. PCT/JP2023/005267 dated Apr. 11, 2023.

(Continued)

*Primary Examiner* — Christopher E Dunay
(74) *Attorney, Agent, or Firm* — Wenderoth, Lind & Ponack L.L.P.

(57) ABSTRACT

A surface light-emitting device includes a plurality of light sources, a light guide that guides light emitted from the plurality of light sources, and a controller that controls turn-on operations of the plurality of light sources. The light guide includes a plurality of light controllers on which the light from the plurality of light sources are incident. The plurality of light controllers are disposed side by side in a first direction intersecting optical axes of the plurality of light controllers, the plurality of light sources include a first light source and a second light source, the first light source is disposed on one of the optical axes of the plurality of light controllers, the second light source is disposed at a position away from the optical axes of the plurality of light controllers, and the controller turns on at least one of the first light source and the second light source.

7 Claims, 10 Drawing Sheets

(56) References Cited

U.S. PATENT DOCUMENTS

| | | | |
|---|---|---|---|
| 2016/0004005 A1 | 1/2016 | Namekata et al. | |
| 2018/0074247 A1* | 3/2018 | Asakawa | G02B 6/0068 |
| 2019/0351814 A1* | 11/2019 | Furubayashi | F21S 43/239 |
| 2022/0043262 A1 | 2/2022 | Agemizu et al. | |
| 2022/0128829 A1* | 4/2022 | Sakaguchi | G02B 27/0972 |
| 2023/0290915 A1* | 9/2023 | Yoshida | F21V 5/007 |
| 2024/0027759 A1 | 1/2024 | Agemizu et al. | |
| 2024/0045206 A1* | 2/2024 | Agemizu | G02B 27/0101 |
| 2024/0151891 A1* | 5/2024 | Okuda | G02B 6/0036 |

FOREIGN PATENT DOCUMENTS

| | | |
|---|---|---|
| JP | 2019-164386 | 9/2019 |
| JP | 2019-200928 | 11/2019 |
| JP | 2020-021640 | 2/2020 |
| JP | 2021-027005 | 2/2021 |
| TW | 201516492 | 5/2015 |
| WO | 2011/024960 | 3/2011 |

OTHER PUBLICATIONS

Extended European Search Report dated Jul. 7, 2025 for the related European Patent Application No. 23788015.8.

* cited by examiner

SURFACE LIGHT-EMITTING DEVICE, DISPLAY DEVICE, AND ILLUMINATION DEVICE

TECHNICAL FIELD

The present invention relates to a surface light-emitting device, a display device, and an illumination device.

BACKGROUND ART

PTL 1 discloses a liquid crystal display device including a liquid crystal panel, viewing angle control means, a prism sheet, and a light guide plate.

The viewing angle control means includes an upper transparent electrode layer, a lower transparent electrode layer, and a transmission state variable layer, and adjusts a voltage applied between the upper transparent electrode layer and the lower transparent electrode layer to change an alignment state of liquid crystals in the transmission state variable layer and controls width and narrowness of a viewing angle.

CITATION LIST

Patent Literature

PTL 1: Unexamined Japanese Patent Publication No. 2019-164386

SUMMARY OF THE INVENTION

However, in the invention of PTL 1, it is necessary to dispose the viewing angle control means for switching light distribution by electrical control between the light guide plate and the liquid crystal panel, and there is a problem that transmittance of light decreases and cost of the entire device increases.

The present invention has been made in view of such a point, and an object thereof is to provide a surface light-emitting device capable of switching between a narrow angle light distribution and a wide angle light distribution with a relatively simple configuration.

A surface light-emitting device according to an aspect of the present disclosure includes a plurality of light sources, a light guide that guides light emitted from the plurality of light sources, and a controller that controls turn-on operations of the plurality of light sources. The light guide includes a plurality of light controllers on which the light from the plurality of light sources are incident, a prism that reflects the light having passed through the plurality of light controllers, a light guide surface on which the prism is provided, and an emission surface that is disposed opposite to the light guide surface and emits the light reflected by the prism. The plurality of light controllers are disposed side by side in a first direction intersecting optical axes of the plurality of light controllers, the plurality of light sources include a first light source and a second light source, the first light source is disposed on one of the optical axes of the plurality of light controllers, the second light source is disposed at a position away from the optical axes of the plurality of light controllers, and the controller turns on at least one of the first light source and the second light source.

As described above, at least one of the first light source and the second light source is turned on, and thus, the incident angle of the light incident on the light controller is changed. As a result, it is possible to switch between the narrow angle light distribution and the wide angle light distribution.

According to the aspect of the present disclosure, it is possible to provide the surface light-emitting device capable of switching between the narrow angle light distribution and the wide angle light distribution with a relatively simple configuration.

BRIEF DESCRIPTION OF THE DRAWINGS

FIG. 8 is a diagram illustrating the light intensity angle distribution in a case where only a first light source for the narrow angle light distribution is turned on.

FIG. 9 is a diagram illustrating the light intensity angle distribution in a case where only a second light source for the wide angle light distribution is turned on.

FIG. 10 is a diagram illustrating a light intensity angle distribution in a case where the first light source and the second light source are simultaneously turned on.

DESCRIPTION OF EMBODIMENT

Hereinafter, exemplary embodiments of the present invention will be described with reference to the drawings. Note that, the following descriptions of the preferable exemplary embodiments are merely examples in essence, and are not intended to limit the present invention, or application or usage of the present invention.

Figure 1:
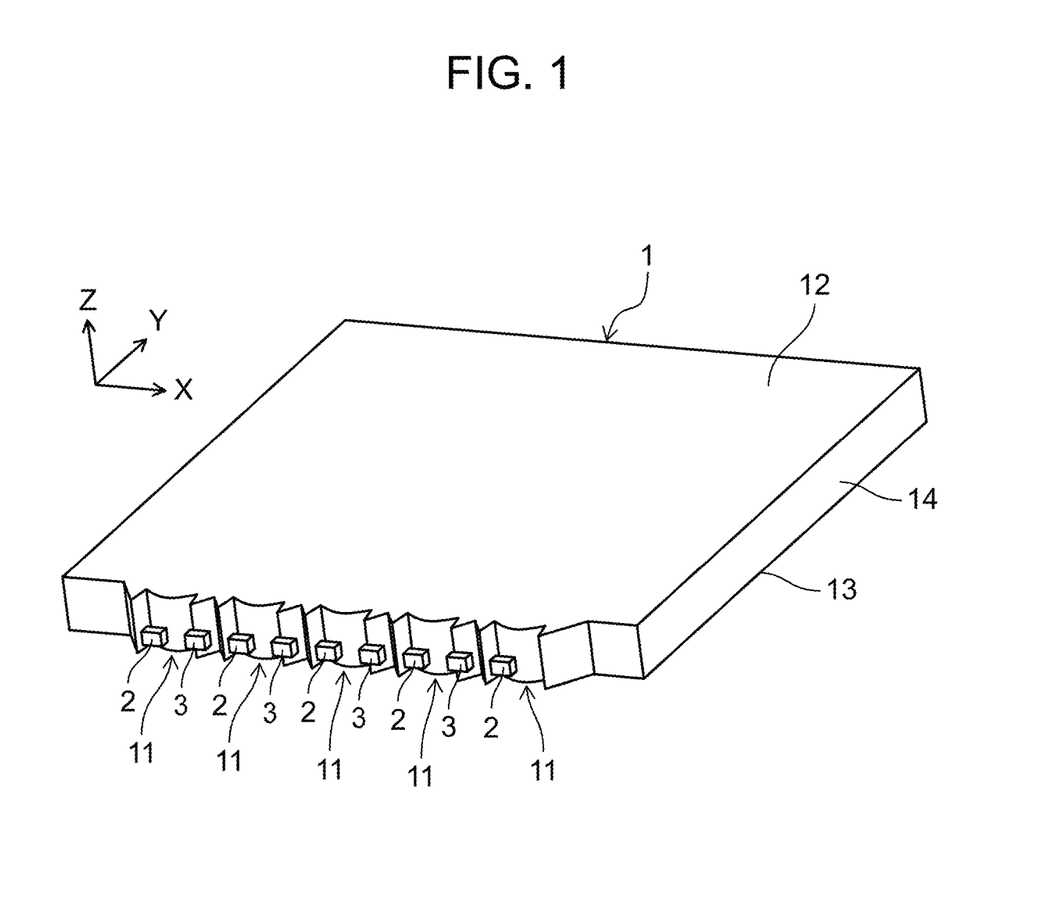
FIG. 1 is a perspective view illustrating a configuration of a surface light-emitting device according to the present exemplary embodiment.
Figure 2:
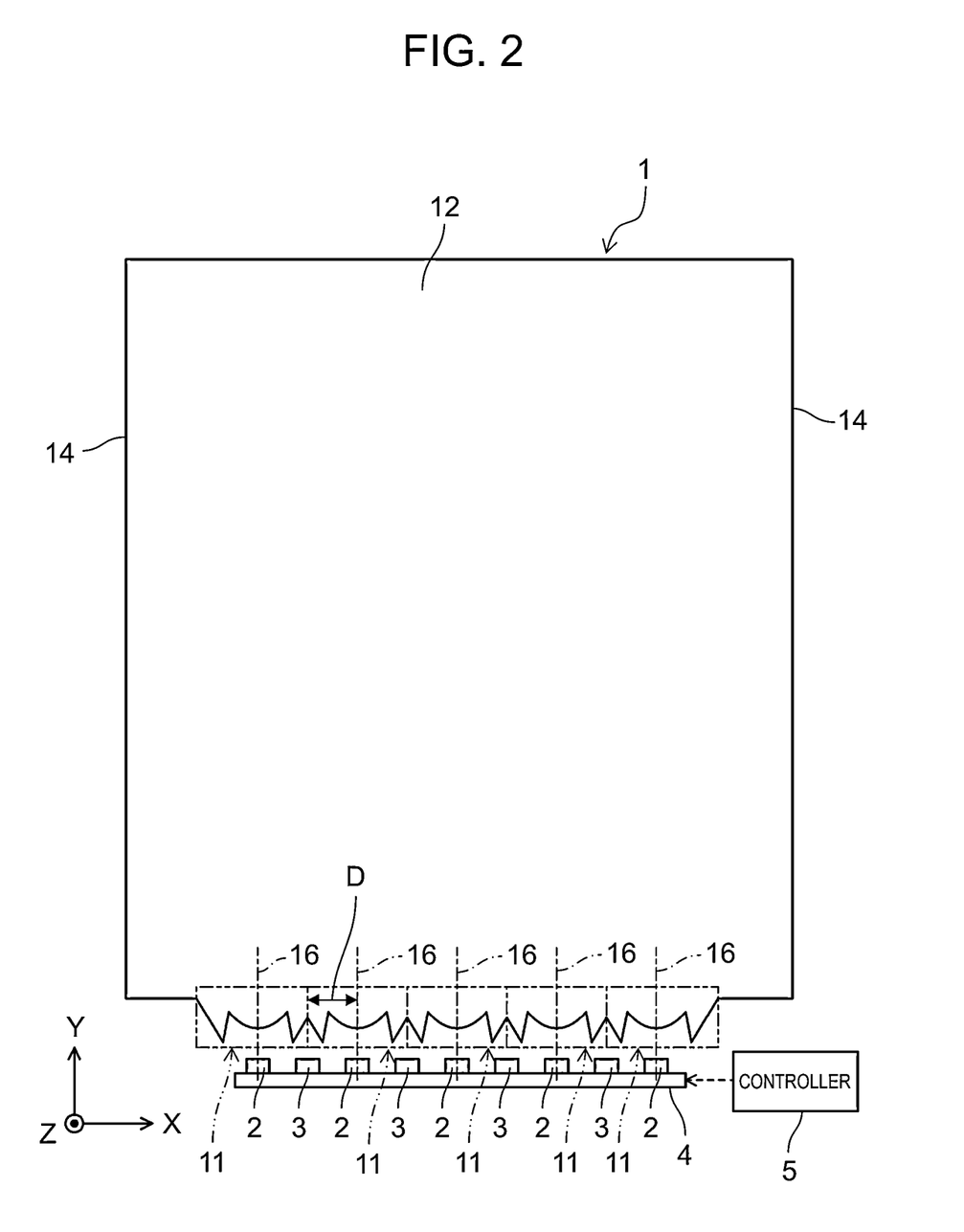
FIG. 2 is a plan view illustrating a configuration of the surface light-emitting device.

As illustrated in FIGS. 1 and 2, surface light-emitting device 10 includes light guide 1, first light sources 2, second light sources 3, and controller 5. First light sources 2 and second light sources 3 are implemented on control board 4. Control board 4 is connected to controller 5.

Light guide 1 guides light emitted from at least one of first light sources 2 and second light sources 3. Light guide 1 is made of a material transparent to visible light. Light guide 1 is made of, for example, polymethyl methacrylate (PMMA), polycarbonate, or the like.

Light guide 1 includes a plurality of light controllers 11, emission surface 12, light guide surface 13, and side surface 14. Note that, in the following description, in a case where an orthogonal coordinate system of an X-axis, a Y-axis, and a Z-axis is used, a right-handed XYZ orthogonal coordinate system in which a normal direction of emission surface 12 is a Z-axis plus direction and a normal direction of side surface 14 is an X-axis plus direction is used.

The plurality of light controllers 11 are disposed side by side in a first direction intersecting optical axis 16 of light controller 11. In the example illustrated in FIGS. 1 and 2, the first direction is an X-axis direction. First light sources 2 and second light sources 3 are alternately disposed along the X-axis direction. Light emitted from at least one of first light sources 2 and second light sources 3 is incident on light controller 11. Note that, a specific configuration of light controller 11 will be described later.

Figure 3:
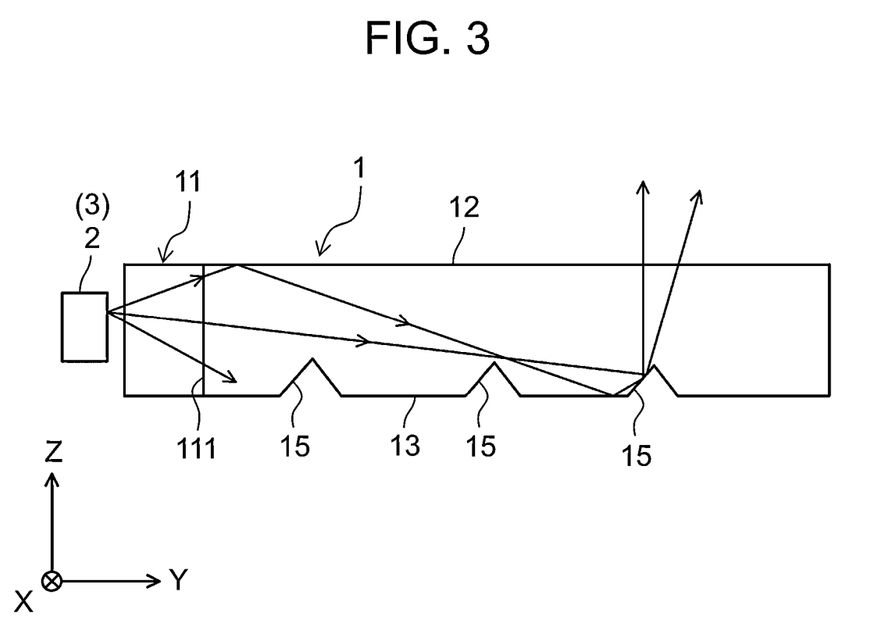
FIG. 3 is a side view illustrating a configuration of the surface light-emitting device.

As illustrated in FIG. 3, prism 15 is provided on light guide surface 13. Prism 15 reflects light passing through light controller 11 and passing through an inside of light guide 1 toward emission surface 12.

Emission surface 12 is disposed opposite to light guide surface 13. Emission surface 12 emits light reflected by prism 15.

As illustrated in FIG. 2, first light source 2 is disposed on one optical axis 16 of optical axes 16 of the plurality of light controllers 11. Second light source 3 is disposed at a position away from optical axis 16 of light controller 11. That is, second light source 3 is not disposed on optical axis 16 of light controller 11.

Here, second light source 3 is disposed within a range of +20% from an intermediate position between two adjacent first light sources 2 with respect to the intermediate position. More specifically, second light source 3 is disposed within a range of 20% of distance D between first light source 2 and second light source 3 with respect to the intermediate position between two adjacent first light sources 2.

In the present exemplary embodiment, second light source 3 includes the same type of light source as first light source 2. Specifically, first light source 2 and second light source 3 are white LEDs. Note that, second light source 3 may be a light source different from first light source 2. For example, second light source 3 may include an LED having a color different from that of first light source 2 or an LED having a spreading angle different from that of first light source 2.

As illustrated in FIG. 3, in surface light-emitting device 10, light is emitted from at least one of first light source 2 and second light source 3 toward light controller 11. Light having passed through light controller 11 is totally reflected by emission surface 12 and light guide surface 13, and propagates in light guide 1.

Figure 4:
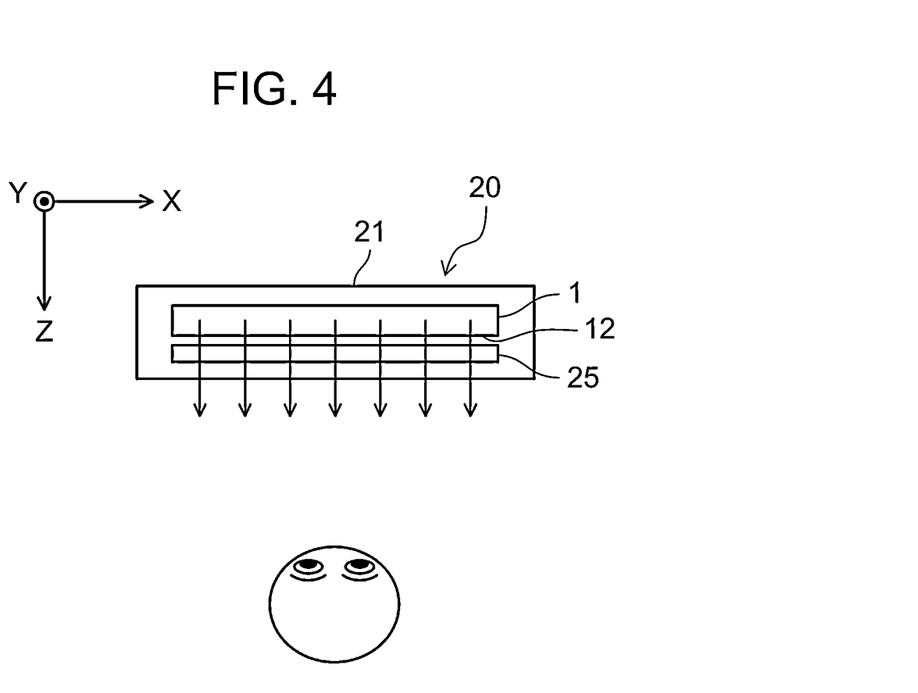
FIG. 4 is a plan view illustrating a configuration of a display device including the surface light-emitting device.
Figure 5:
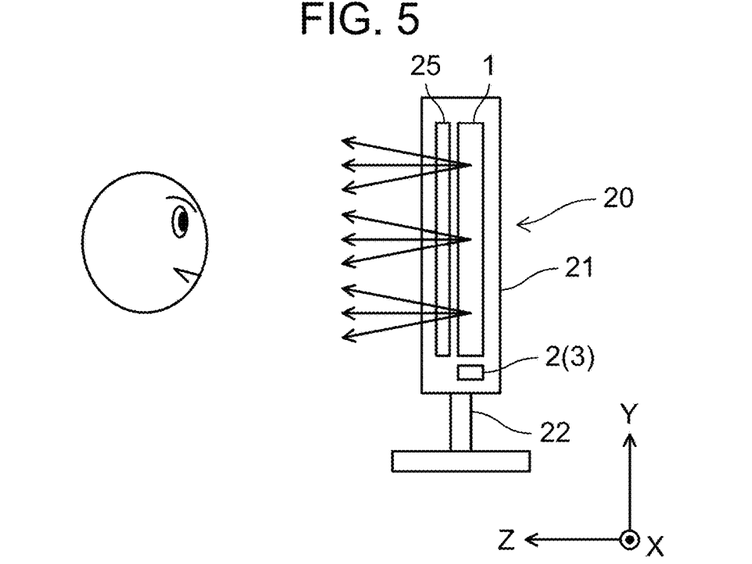
FIG. 5 is a side view illustrating a configuration of the display device including the surface light-emitting device.

As illustrated in FIGS. 4 and 5, surface light-emitting device 10 is used as a backlight of display device 20. Display device 20 includes surface light-emitting device 10, housing 21, and liquid crystal panel 25.

Housing 21 houses surface light-emitting device 10 and liquid crystal panel 25. Housing 21 is supported by support base 22. Note that, display device 20 may not include support base 22. Liquid crystal panel 25 is disposed on emission surface 12 side of light guide 1 in surface light-emitting device 10. Liquid crystal panel 25 is disposed toward a user.

As illustrated in FIG. 2, controller 5 is connected to control board 4 on which first light source 2 and second light source 3 are implemented. Controller 5 controls turn-on operations of first light source 2 and second light source 3. Controller 5 switches between a narrow angle light distribution and a wide angle light distribution by turning on at least one of first light source 2 and second light source 3. An example of controller 5 is a processor that controls the turn-on operations of first light source 2 and second light source 3.

(About Narrow Angle Light Distribution)

Hereinafter, means for forming the narrow angle light distribution will be described.

Figure 6:
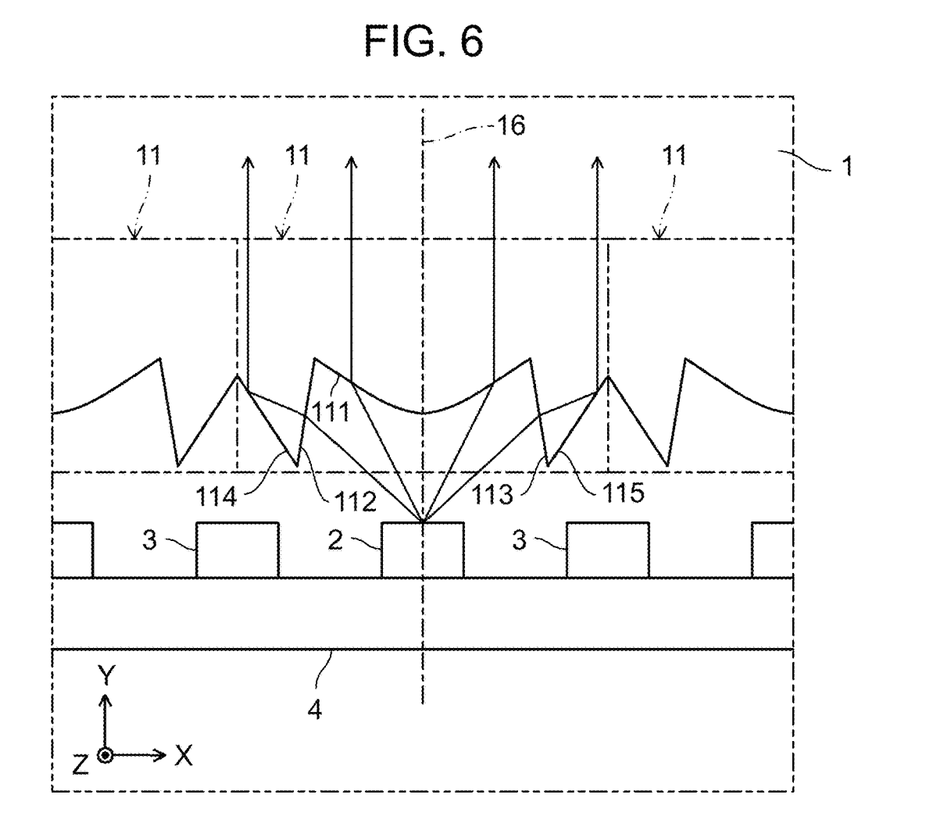
FIG. 6 is a schematic view for explaining light forming a narrow angle light distribution.

As illustrated in FIG. 6, light controller 11 constitutes an incident lens. Light controller 11 includes primary incident surface 111, secondary incident surface 112, and secondary incident surface 113.

First light source 2 is disposed on optical axis 16 of light controller 11. Second light source 3 is not disposed on optical axis 16 of light controller 11.

Primary incident surface 111 is disposed opposite to first light source 2. Secondary incident surface 112 and secondary incident surface 113 are directed to a normal line of primary incident surface 111. Secondary incident surface 112 and secondary incident surface 113 are positioned in at least a part around primary incident surface 111.

Here, for example, in a case where primary incident surface 111 has a dome shape, the normal line of primary incident surface 111 is the normal line of primary incident surface 111 at a distal end (vertex of the dome). In the example illustrated in FIG. 6, the normal line of primary incident surface 111 coincides with optical axis 16 of light controller 11.

Primary incident surface 111 converts light emitted from optical axis 16 of first light source 2 into light substantially parallel to the Y-axis on an XY plane.

Light controller 11 further includes outer peripheral surface 114 and outer peripheral surface 115.

Outer peripheral surface 114 is positioned on a side opposite to the normal line of primary incident surface 111 as viewed from secondary incident surface 112. Outer peripheral surface 114 totally reflects light emitted from on optical axis 16 of first light source 2 and incident on light controller 11 from secondary incident surface 112 to convert the light into light substantially parallel to the Y-axis on the XY plane.

Outer peripheral surface 115 is positioned on a side opposite to the normal line of primary incident surface 111 as viewed from secondary incident surface 113. Outer peripheral surface 115 totally reflects light emitted from on optical axis 16 of first light source 2 and incident on light controller 11 from secondary incident surface 113 to convert the light into light substantially parallel to the Y-axis on the XY plane.

Note that, the term "substantially parallel" in the present exemplary embodiment means that an angle falls within a range of about several degrees (for example, less than 10 degrees).

The light emitted from first light source 2 is converted into substantially parallel light with respect to the Y-axis on the XY plane by light controller 11, and is incident on the inside of light guide 1. Thus, the light reflected from prism 15 toward emission surface 12 is also substantially parallel to the Z-axis on the XZ plane.

As described above, the light emitted from light guide 1 can form the narrow angle light distribution substantially parallel to the Z-axis on the XZ plane.

(About Wide Angle Light Distribution)

Hereinafter, means for forming the wide angle light distribution will be described.

Figure 7:
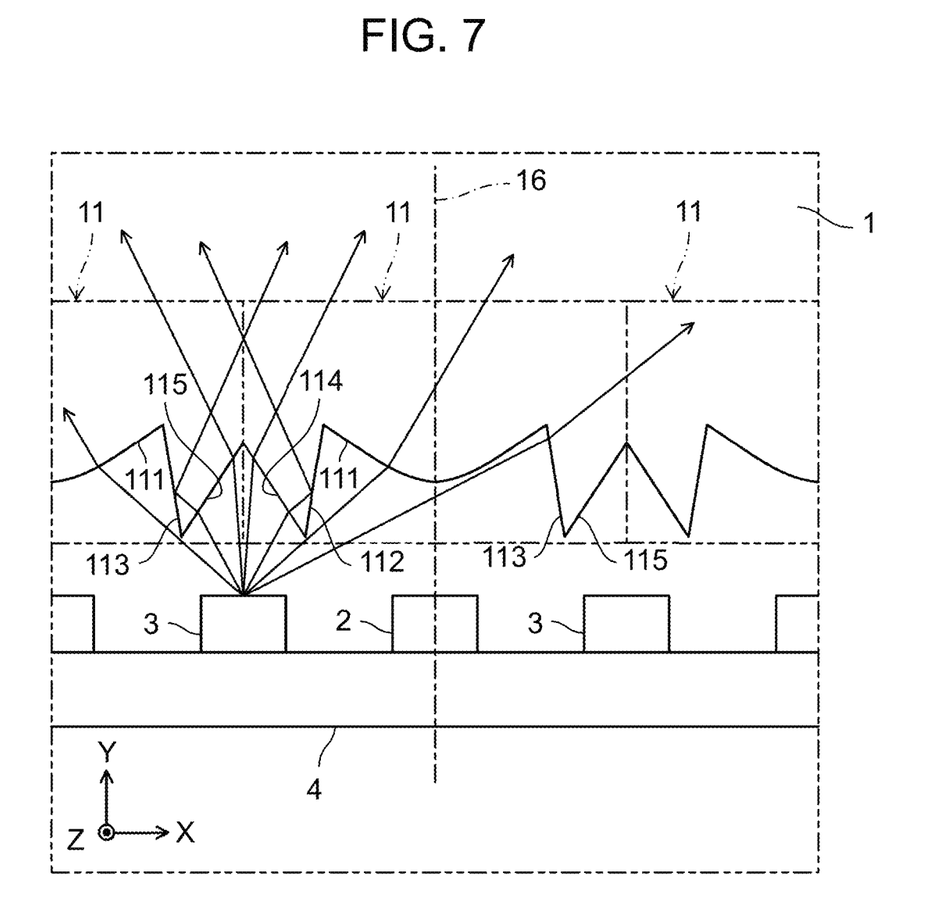
FIG. 7 is a schematic view for explaining light for forming a wide angle light distribution.

As illustrated in FIG. 7, the light emitted from second light source 3 not disposed on optical axis 16 of light controller 11 enters light guide 1 from primary incident surface 111, secondary incident surface 112, secondary incident surface 113, outer peripheral surface 114, and outer peripheral surface 115.

Primary incident surface 111, secondary incident surface 112, secondary incident surface 113, outer peripheral surface 114, and outer peripheral surface 115 have shapes that convert light on optical axis 16 of light controller 11 into substantially parallel light. Thus, most of the light from second light source 3 disposed outside optical axis 16 of light controller 11 is not converted into substantially parallel, and spreads inside light guide 1 on the XY plane. As a result, the light reflected from prism 15 toward emission surface 12 also becomes light spreading with respect to the Z-axis on the XZ plane.

The turn-on operations of first light source 2 for the narrow angle light distribution and second light source 3 for the wide angle light distribution are combined, and thus, the light emitted from light guide 1 can form a wide angle light distribution having a certain range of spread with respect to the Z-axis on the XZ plane.

(About Combination of Narrow Angle Light Distribution and Wide Angle Light Distribution)

Next, the combination of the turn-on operations of first light source 2 for the narrow angle light distribution and second light source 3 for the wide angle light distribution will be described. In the following FIGS. 8 to 10, a light intensity angle distribution when light guide 1 is viewed from emission surface 12 side is illustrated.

Figure 8:
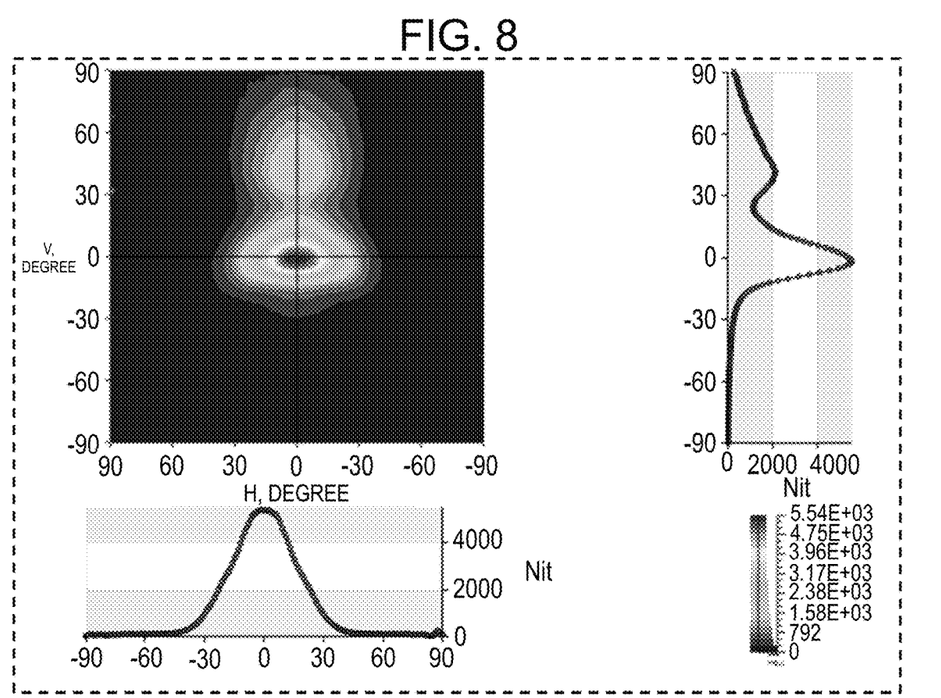

FIG. 8 is a diagram illustrating a light intensity angle distribution in a case where only first light source 2 for the narrow angle light distribution is turned on. A horizontal axis indicates the spread of the light emitted from light guide 1 in an XZ plane, and a vertical axis indicates the spread of the light emitted from light guide 1 in a YZ plane.

As illustrated in FIG. 8, when the spread of the light is defined as a half width that is 50% of a peak value, the light distribution has a spread of ±15 degrees.

Note that, although light controller 11 is designed to convert light emitted from optical axis 16 into substantially parallel light, since actual first light source 2 has a certain size of the light-emitting surface, light emitted from other than optical axis 16 cannot be converted into substantially parallel light, and the spread of the emitted light increases in accordance with the size of the light-emitting surface of the light source.

Figure 9:
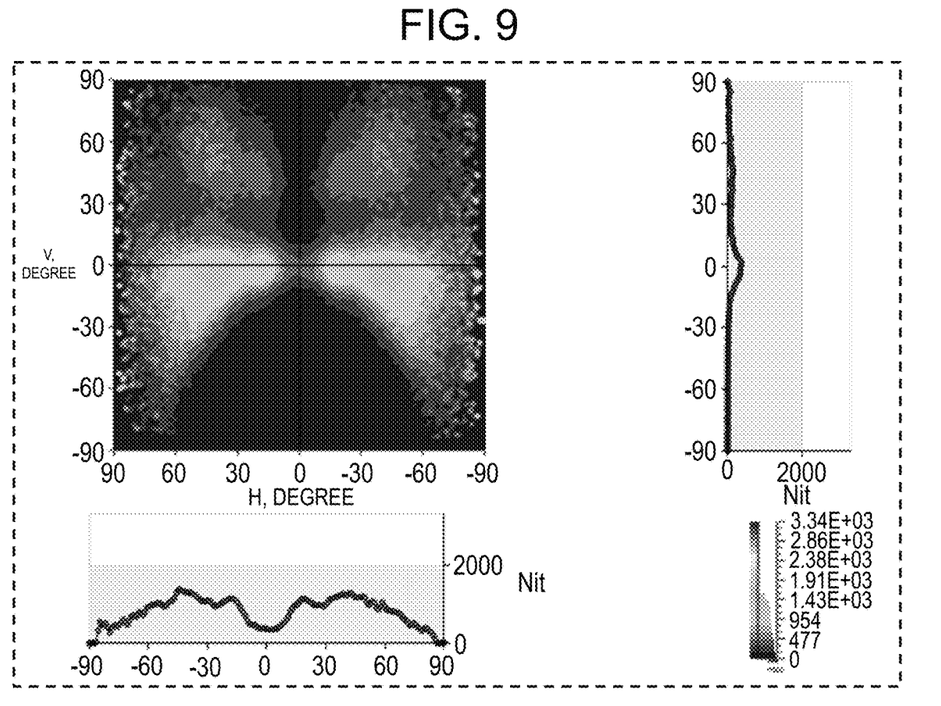

FIG. 9 is a diagram illustrating the light intensity angle distribution in a case where only second light source 3 for the wide angle light distribution is turned on. A horizontal axis indicates the spread of the light emitted from light guide 1 in an XZ plane, and a vertical axis indicates the spread of the light emitted from light guide 1 in a YZ plane.

As illustrated in FIG. 9, when the spread of the light is defined as a half width that is 50% of a peak value, the light distribution has a spread of ±60 degrees.

Figure 10:
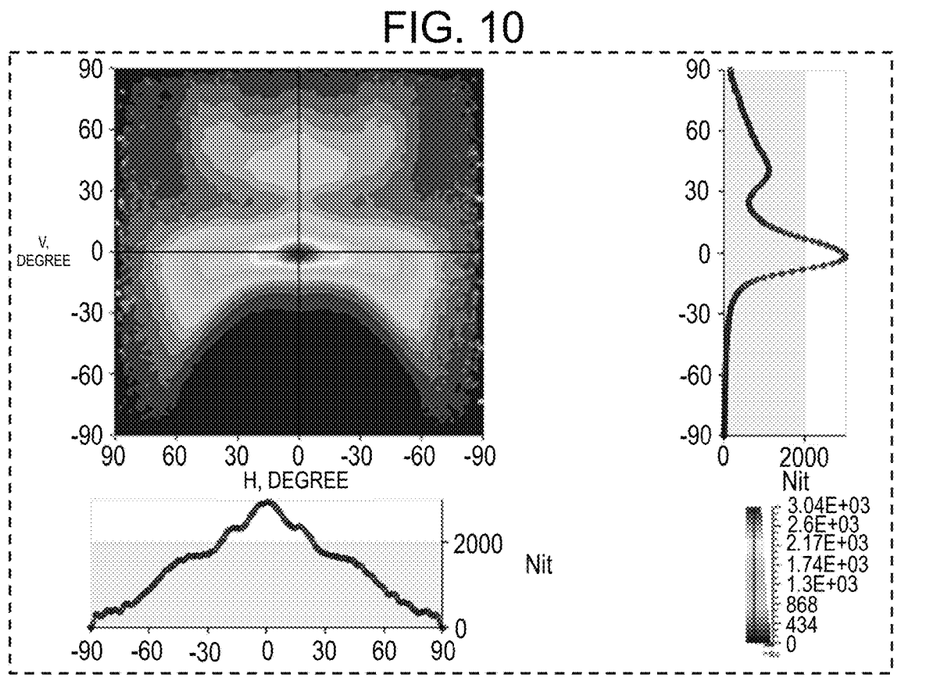

FIG. 10 is a diagram illustrating the light intensity angle distribution in a case where first light source 2 and second light source 3 are simultaneously turned on. A horizontal axis indicates the spread of the light emitted from light guide 1 in an XZ plane, and a vertical axis indicates the spread of the light emitted from light guide 1 in a YZ plane.

As illustrated in FIG. 10, when the spread of the light is defined as a half width that is 50% of a peak value, the light distribution has a spread of ±45 degrees.

As described above, the narrow angle light distribution and the wide angle light distribution of light guide 1 can be switched by switching between a case where only first light source 2 is turned on and a case where first light source 2 and second light source 3 are simultaneously turned on.

First Modified Example of Exemplary Embodiment

Figure 11:
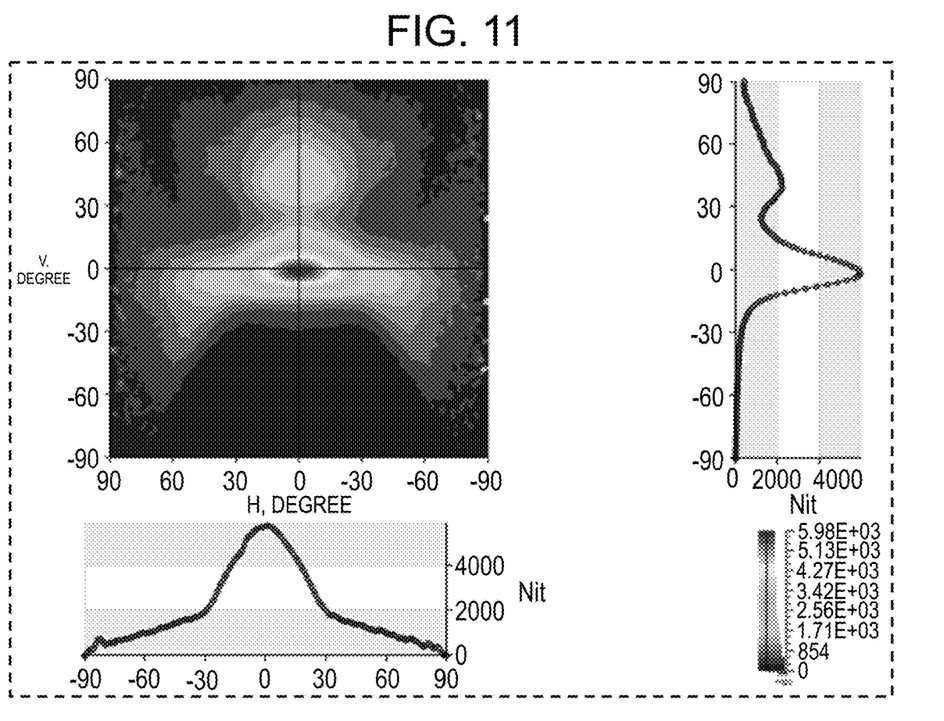
FIG. 11 is a diagram illustrating a light intensity angle distribution in a case where a light amount of the second light source for the wide angle light distribution is reduced with respect to a light amount of the first light source for the narrow angle light distribution in the present first modified example.

As illustrated in FIG. 11, the spread of the light distribution may be changed by adjusting light amounts of first light source 2 for the narrow angle light distribution and second light source 3 for the wide angle light distribution.

FIG. 11 is a diagram illustrating the light intensity angle distribution in a case where the light amount of second light source 3 for the wide angle light distribution is smaller than the light amount of first light source 2 for the narrow angle light distribution.

Here, as illustrated in FIG. 10 described above, in a case where the light amount of second light source 3 with respect to the light amount of first light source 2 is not adjusted, in a case where light intensity at 0 degrees in a horizontal direction is 100%, light intensity at 30 degrees in the horizontal direction is about 50%.

On the other hand, as illustrated in FIG. 11, in a case where the light amount of second light source 3 is adjusted to be smaller than the light amount of first light source 2, in a case where light intensity at 0 degrees in a horizontal direction is set to 100%, light intensity at 30 degrees in the horizontal direction can be about 30%.

Second Modified Example of Exemplary Embodiment

Figure 12:
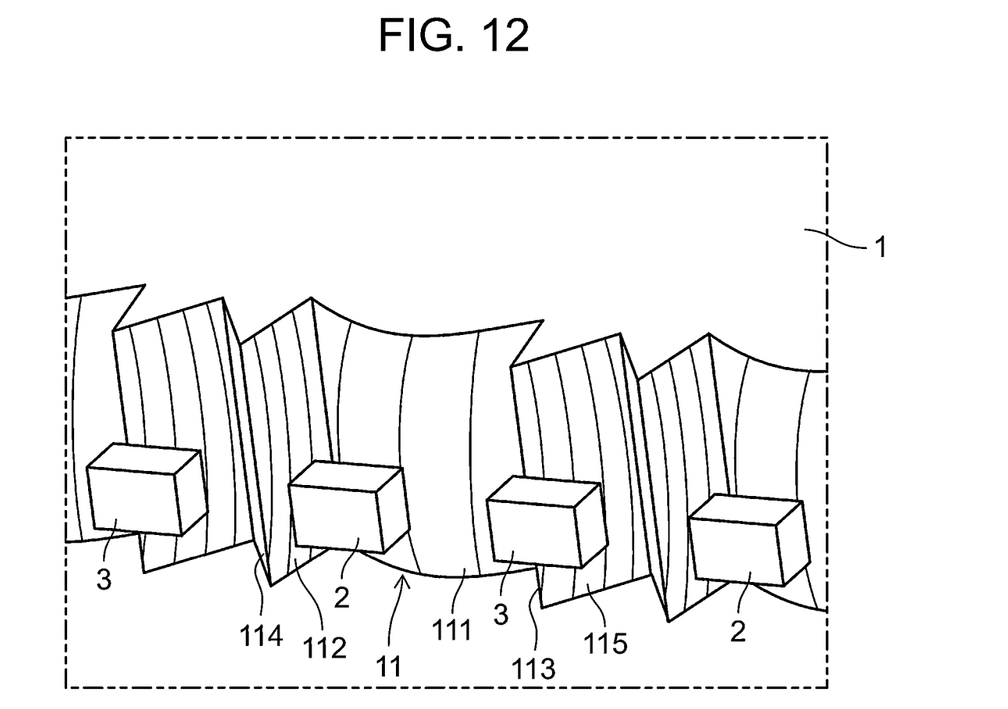
FIG. 12 is a perspective view illustrating a configuration of a surface light-emitting device according to the present second modified example.
Figure 13:
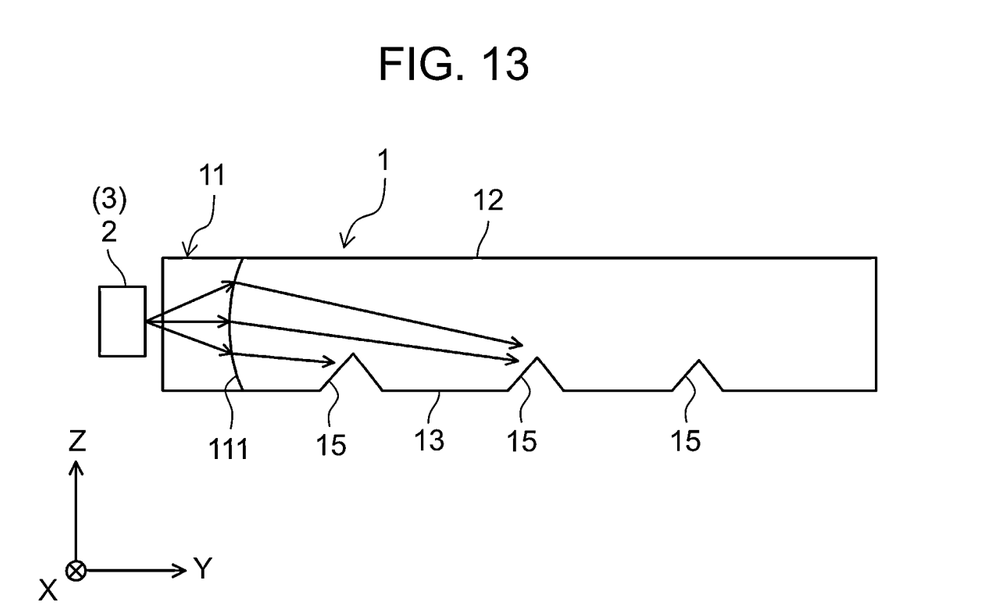
FIG. 13 is a side view illustrating a configuration of the surface light-emitting device.

As illustrated in FIGS. 12 and 13, a shape of light controller 11 may be changed.

Light controller 11 includes primary incident surface 111, secondary incident surface 112, secondary incident surface 113, outer peripheral surface 114, and outer peripheral surface 115.

Primary incident surface 111 is formed to have a curvature in a Z-axis direction. Specifically, primary incident surface 111 is formed in a convex lens shape curved to protrude toward first light source 2.

Secondary incident surface 112 and secondary incident surface 113 are formed to have curvature in the Z-axis direction. Specifically, secondary incident surface 112 and secondary incident surface 113 are formed in a shape curved to protrude toward first light source 2.

outer peripheral surface 114 and outer peripheral surface 115 are formed to have curvature in the Z-axis direction. Specifically, outer peripheral surface 114 and outer peripheral surface 115 are formed in a shape curved to protrude toward second light source 3.

With such a configuration, the light emitted from first light source 2 and second light source 3 is condensed by light controller 11, and the spread of the light on the YZ plane in light guide 1 can be controlled.

Third Modified Example of Exemplary Embodiment

Figure 14:
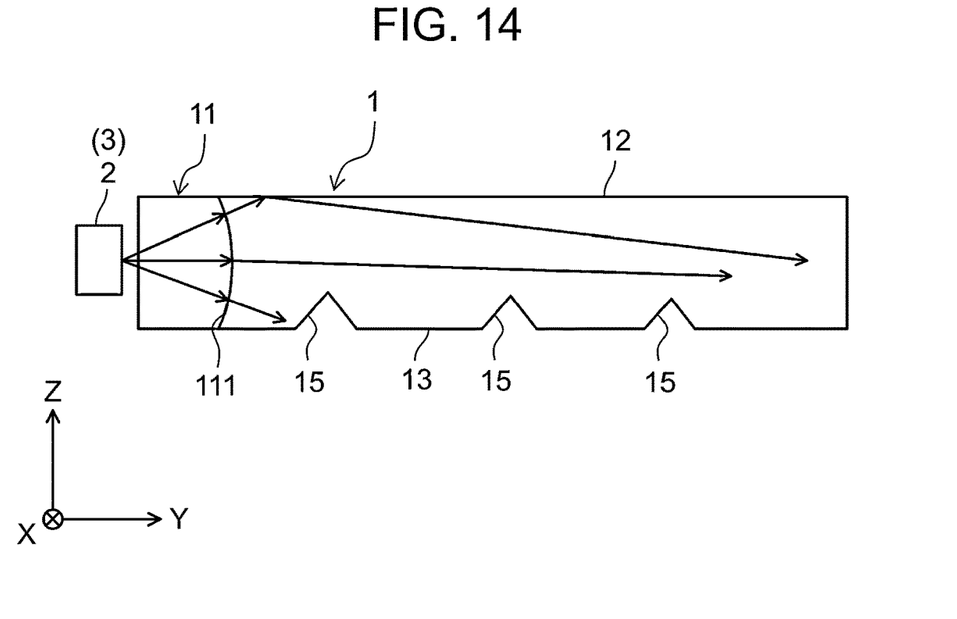
FIG. 14 is a side view illustrating a configuration of a surface light-emitting device according to the present third modified example.

As illustrated in FIG. 14, the shape of light controller 11 may be changed.

Light controller 11 includes primary incident surface 111, secondary incident surface 112, secondary incident surface 113, outer peripheral surface 114, and outer peripheral surface 115. Note that, in the example illustrated in FIG. 14, only primary incident surface 111 will be described.

Primary incident surface 111 is formed to have a curvature in a Z-axis direction. Specifically, primary incident surface 111 is formed in a concave lens shape that is curved and recessed with respect to first light source 2.

With such a configuration, the light emitted from first light source 2 and second light source 3 is diverged in light controller 11, and the spread of the light on the YZ plane in light guide 1 can be controlled.

Note that, secondary incident surface 112, secondary incident surface 113, outer peripheral surface 114, and outer peripheral surface 115 may be similarly formed in concave lens shapes.

Fourth Modified Example of Exemplary Embodiment

Figure 15:
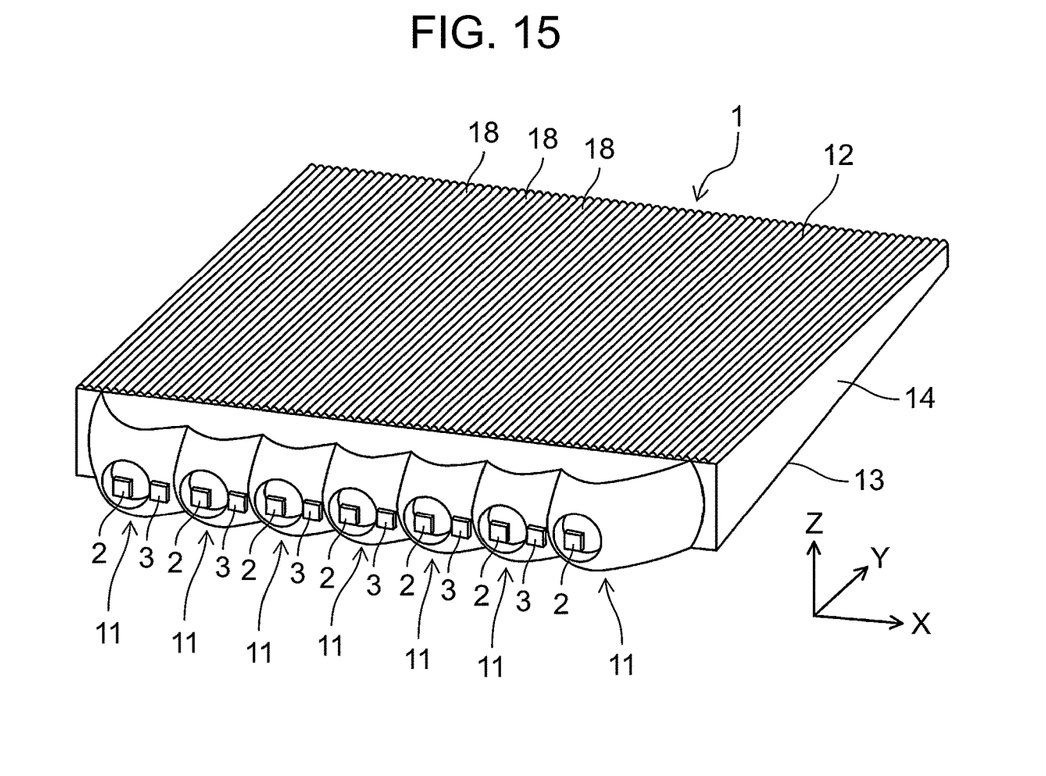
FIG. 15 is a perspective view illustrating a configuration of a surface light-emitting device according to the present fourth modified example.
Figure 16:
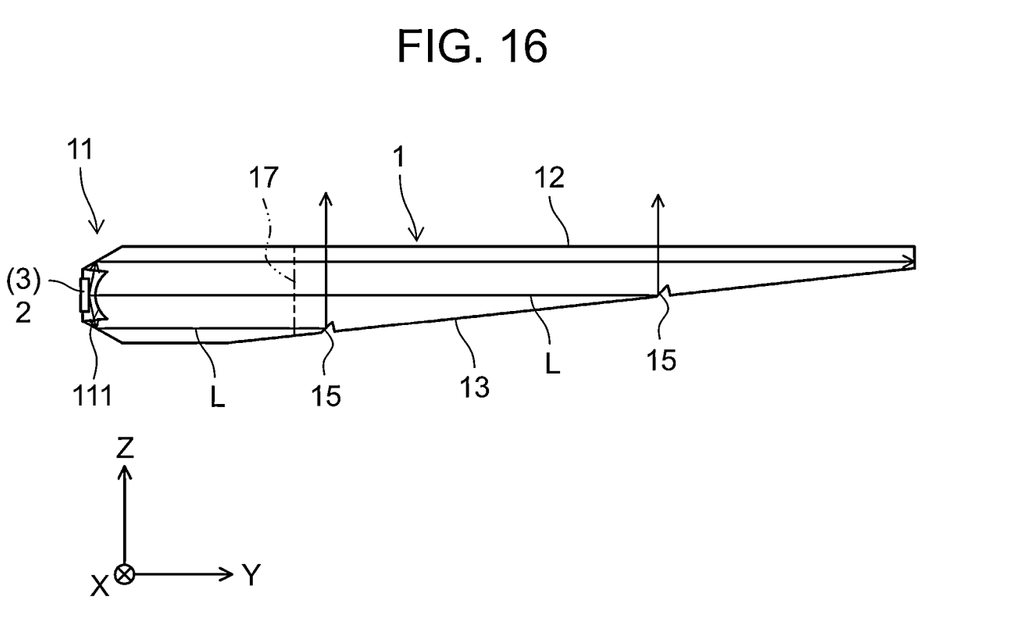
FIG. 16 is a side view illustrating a configuration of the surface light-emitting device.

As illustrated in FIGS. 15 and 16, light guide 1 may include direct optical path L in which the light incident from light controller 11 is directly reflected by prism 15 and is emitted from emission surface 12.

As illustrated in FIG. 15, a multi-lens including a group of a plurality of small lenses 18 is provided on emission surface 12 of light guide 1. In the present exemplary embodiment, each of the plurality of small lenses 18 is formed in a semi-cylindrical shape. The plurality of small lenses 18 are disposed side by side in the X-axis direction. Small lens 18 controls light distribution by refracting and diverging or converging emitted light extracted from emission surface 12. Note that, small lens 18 may not be provided on emission surface 12.

As illustrated in FIG. 16, the light radially spreading from first light source 2 passes through light controller 11 to become parallel light. Light controller 11 causes the light emitted from first light source 2 to be incident on incident surface 17 of light guide 1.

Emission surface 12 is a plane parallel to the XY plane. The XY plane is a plane including the X-axis and the Y-axis and is a plane orthogonal to the Z-axis. Incident surface 17 is a plane parallel to the XZ plane. The XZ plane is a plane including the X-axis and the Z-axis and is orthogonal to the Y-axis.

Light guide surface 13 is not parallel to the XY plane but is a plane inclined with respect to the XY plane. Specifically, light guide surface 13 is inclined with respect to the XY plane, and becomes closer to emission surface 12 as the light guide surface 13 becomes distant from incident surface 17. That is, emission surface 12 and light guide surface 13 are inclined to each other.

A plurality of prisms 15 are provided on light guide surface 13. Prisms 15 reflect light passing through the inside of light guide 1 toward emission surface 12. In light guide 1, most of the light having passed through incident surface 17 is emitted from emission surface 12 by being reflected by prism 15 without being reflected by light guide surface 13 or a portion of emission surface 12 excluding prism 15.

That is, light guide 1 includes direct optical path L along which light incident from light controller 11 is directly reflected by prisms 15 and the light is emitted as the emitted light from emission surface 12. Accordingly, light taking efficiency can be improved.

Other Exemplary Embodiments

The exemplary embodiment may have the following configuration.

Figure 17:
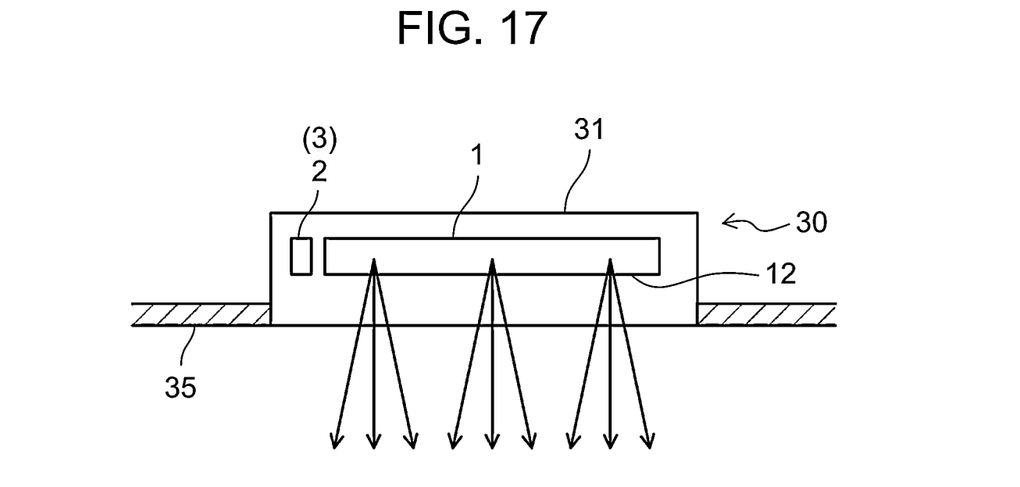
FIG. 17 is a side view illustrating a configuration of an illumination device including a surface light-emitting device according to another exemplary embodiment.

In the present exemplary embodiment, although the configuration in which surface light-emitting device 10 is used as the backlight of display device 20 has been described, the present invention is not limited to this mode. For example, as illustrated in FIG. 17, surface light-emitting device 10 may be used as illumination device 30.

Illumination device 30 includes surface light-emitting device 10 and housing 31. Surface light-emitting device 10 is accommodated in housing 31. Illumination device 30 is embedded in ceiling 35, for example. Emission surface 12 of light guide 1 in surface light-emitting device 10 is disposed on an indoor space side. Accordingly, illumination device 30 including surface light-emitting device 10 can be used as a downlight. Note that, illumination device 30 is not limited to be disposed in the indoor space, and may be disposed in an outdoor space.

INDUSTRIAL APPLICABILITY

As described above, the present disclosure is useful for a surface light-emitting device capable of switching between narrow angle light distribution and wide angle light distribution.

REFERENCE MARKS IN THE DRAWINGS 1 light guide
2 first light source
3 second light source
5 controller
10 surface light-emitting device
11 light controller
12 emission surface
13 light guide surface
15 prism
16 optical axis
20 display device
30 illumination device
L direct optical path

The invention claimed is:

1. A surface light-emitting device comprising:
a plurality of light sources;
a light guide that guides light emitted from the plurality of light sources; and
a controller that controls turn-on operations of the plurality of light sources,
wherein
the light guide includes
a plurality of light controllers on which the light from the plurality of light sources are incident,
a prism that reflects the light having passed through the plurality of light controllers,
a light guide surface on which the prism is provided, and
an emission surface that is disposed opposite to the light guide surface and emits the light reflected by the prism,
when a normal direction of the emission surface is a Z-axis direction, a normal direction of a side surface of the light guide is an X-axis direction, and a direction perpendicular to the X-axis direction and the Z-axis direction is a Y-axis direction, the plurality of light controllers are arranged in a line along the X-axis direction so that an optical axis of each of the plurality of light controllers is parallel to the Y-axis direction, each of the plurality of light controllers comprises:
- a dome-shaped primary incident surface, a normal to a vertex of the dome-shaped primary incident surface coinciding with the optical axis;
- a first secondary incident surface and a second secondary incident surface provided on opposite sides of the dome-shaped primary incident surface in the X-axis direction, and the first secondary incident surface and the second secondary incident surface being directed to the normal to the vertex of the dome-shaped primary incident surface;
- a first outer peripheral surface provided on an opposite side of the dome-shaped primary incident surface from the first secondary incident surface in the X-axis direction; and
- a second outer peripheral surface provided on an opposite side of the dome-shaped primary incident surface from the second secondary incident surface in the X-axis direction, the plurality of light sources include a plurality of first light sources and a plurality of second light sources, the first light sources and the second light sources being alternately disposed along the X-axis direction, the optical axis of each of the plurality of first light sources passes through the vertex of a respective one of the dome-shaped primary incident surfaces, each of the plurality of second light sources faces one of the first outer peripheral surfaces and/or one of the second outer peripheral surfaces, and the controller is configured to turn on at least one of the first light sources or the second light sources.

2. The surface light-emitting device according to claim 1, wherein the second light sources include a same type of light source as the first light sources.

3. The surface light-emitting device according to claim 1, wherein the light guide includes a direct optical path that directly reflects the light incident from the plurality of light controllers by the prism and emits the light from the emission surface.

4. A display device comprising the surface light-emitting device according to claim 1.

5. An illumination device comprising the surface light-emitting device according to claim 1.

6. The surface light-emitting device according to claim 1, wherein
the control unit is configured to select one of:
- turning on only the first light sources;
- turning on only the second light sources; and
- turning on the first light sources and the second light sources simultaneously, so that a light intensity angle distribution when the light guide is viewed from a side of the emission surface can be changed between three levels.

7. The surface light emitting device according to claim 1, wherein
the first outer peripheral surfaces and the second outer peripheral surfaces are each formed in a shape curved to protrude toward one of the second light sources.

* * * * *